US011930355B2

(12) United States Patent
Suh et al.

(10) Patent No.: US 11,930,355 B2
(45) Date of Patent: Mar. 12, 2024

(54) APPARATUS AND METHOD FOR INFORMATION SECURITY

(71) Applicant: Samsung Electronics Co., Ltd., Gyeonggi-do (KR)

(72) Inventors: Kyungjoo Suh, Gyeonggi-do (KR); Sangjun Moon, Gyeonggi-do (KR); Kisuk Kweon, Gyeonggi-do (KR); Youngkyo Baek, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 158 days.

(21) Appl. No.: 17/282,888

(22) PCT Filed: Oct. 4, 2019

(86) PCT No.: PCT/KR2019/013053
§ 371 (c)(1),
(2) Date: Apr. 5, 2021

(87) PCT Pub. No.: WO2020/071862
PCT Pub. Date: Apr. 9, 2020

(65) Prior Publication Data
US 2021/0352473 A1 Nov. 11, 2021

(30) Foreign Application Priority Data
Oct. 5, 2018 (KR) ........................ 10-2018-0119297

(51) Int. Cl.
*H04L 9/00* (2022.01)
*H04W 12/04* (2021.01)
*H04W 88/14* (2009.01)

(52) U.S. Cl.
CPC ............ *H04W 12/04* (2013.01); *H04W 88/14* (2013.01)

(58) Field of Classification Search
CPC .................................................. H04W 12/04
(Continued)

(56) References Cited

U.S. PATENT DOCUMENTS

2008/0011833 A1 1/2008 Saarisalo
2013/0343280 A1* 12/2013 Lee .................. H04L 63/20
370/328
(Continued)

FOREIGN PATENT DOCUMENTS

KR 10-1819409 1/2018
KR 1020180004612 1/2018
(Continued)

OTHER PUBLICATIONS

3rd generation partnership project, Technical Specification Group Services and System Aspects; security architecture and procedures for 5G system (Release 15), Sep. 2018 (Year: 2018).*
(Continued)

*Primary Examiner* — Brandon Hoffman
*Assistant Examiner* — Samuel Ambaye
(74) *Attorney, Agent, or Firm* — The Farrell Law Firm P.C.

(57) ABSTRACT

The present disclosure relates to a 5th (5G) generation or pre-5G communication system for supporting a higher data transmission rate beyond a 4th (4G) generation communication system such as long term evolution (LTE). According to various embodiments of the present disclosure, an apparatus of a user data management (UDM) for a first cellular network in a wireless communication system may include at least one transceiver, and at least one processor operatively coupled with the at least one transceiver, the at least one processor may be configured to receive a request message for security of a second cellular network from an access and mobility management function (AMF) for the first cellular network, and transmit to the AMF a response message for
(Continued)

transmitting a security key for an eNB of the second cellular network to the eNB, and the security key may be obtained from the base security key of the second cellular network.

12 Claims, 6 Drawing Sheets

(58) Field of Classification Search
USPC .......................................................... 380/277
See application file for complete search history.

(56) References Cited

U.S. PATENT DOCUMENTS

| | | | |
|---|---|---|---|
| 2018/0007552 | A1 | 1/2018 | Bae et al. |
| 2019/0254097 | A1* | 8/2019 | Prasad .............. H04W 12/0431 |

FOREIGN PATENT DOCUMENTS

| WO | WO2018008983 | 1/2018 |
|---|---|---|
| WO | WO2018137866 | 8/2018 |

OTHER PUBLICATIONS

3rdgeneration partnership project, Technical Specification Group Services and System Aspects; security architecture and procedures for 5G system (Release15), Sep. 2018(Year:2018) (Year: 2018).*
PCT/ISA/210 Search Report issued on PCT/KR2019/013053, dated Jan. 20, 2020, pp. 5.
PCT/ISA/237 Written Opinion issued on PCT/KR2019/013053, dated Jan. 20, 2020, pp. 6.
3GPP TS 33.501 V15.2.0 (Sep. 2018), Technical Specification, pp. 176.
Huawei, HiSilicon, "Security in secondary node in tight interworking", 3GPP TSG-RAN WG2 #97 R2-1701849 (Resubmission of R2-1700302), . . . Athens, Greece, Feb. 13-17, 2017, pp. 8.
Huawei, HiSilicon, "Update key hierarchy", 3GPP TSG SA WG3 (Security) Meeting #89 S3-173144 Nov. 27-Dec. 1, 2017, Reno, USA, pp. 5.
Korean Office Action dated Feb. 21, 2023 issued in counterpart application No. 10-2018-0119297, 9 pages.
KR Notice of Patent Grant dated Aug. 22, 2023 issued in counterpart application No. 10-2018-0119297, 5 pages.

* cited by examiner

APPARATUS AND METHOD FOR INFORMATION SECURITY

PRIORITY

This application is a National Phase Entry of International Application No. PCT/KR2019/013053 filed on Oct. 4, 2019, and claims priority to Korean Patent Application No. 10-2018-0119297 filed Oct. 5, 2018, the content of each of which is incorporated herein by reference.

BACKGROUND ART

The present disclosure relates generally to a communication system, and more particularly, to an apparatus and a method for information security in the communication system.

To satisfy a wireless data traffic demand which is growing after a $4^{th}$ generation (4G) communication system is commercialized, efforts are exerted to develop an advanced $5^{th}$ generation (5G) communication system or a pre-5G communication system. For this reason, the 5G communication system or the pre-5G communication system is referred to as a beyond 4G network communication system or a post long term evolution (LTE) system.

To achieve a high data rate, the 5G communication system considers its realization in an extremely high frequency (mmWave) band (e.g., 60 GHz band). To mitigate a path loss of propagation and to extend a propagation distance in the extremely high frequency band, the 5G communication system is discussing beamforming, massive multiple input multiple output (MIMO), full dimensional (FD)-MIMO, array antenna, analog beam-forming, and large scale antenna techniques.

Also, for network enhancement of the system, the 5G communication system is developing techniques such as evolved small cell, advanced small cell, cloud radio access network (RAN), ultra-dense network, device to device (D2D) communication, wireless backhaul, moving network, cooperative communication, coordinated multi-points (CoMP), and receive interference cancellation.

Besides, the 5G system is working on hybrid frequency shift keying and quadrature amplitude modulation (FQAM) and sliding window superposition coding (SWSC) as advanced coding modulation (ACM) schemes, and filter bank multi carrier (FBMC), non-orthogonal multiple access (NOMA), and sparse code multiple access (SCMA) as advanced access technologies.

Various methods for information security in the 5G communication system are being discussed.

SUMMARY

Based on the discussions described above, the present disclosure provides an apparatus and a method for information security in an environment where different mobile networks coexist, in a wireless communication system.

In addition, the present disclosure provides an apparatus and a method for information security as an entity for managing mobility and an entity for managing session are separated in a wireless communication system.

According to various embodiments of the present disclosure, an operating method of an access and mobility management function (AMF) for a first communication system in a wireless communication system may include transmitting a request message for security of the second communication system to a user data management (UDM), receiving a response message from the UDM, and transmitting a security key for an eNB of the second communication system to the eNB, based on the response message, wherein the security key may be obtained from the base security key of the second communication system, and the base security key may be associated with a security key of the first communication system.

According to various embodiments of the present disclosure, an operating method of a UDM for a first communication system in a wireless communication system may include receiving a request message for security of a second communication system from an AMF for the first communication system, and transmitting to the AMF a response message for transmitting a security key for an eNB of the second communication system to the eNB, wherein the security key may be obtained from the base security key of the second communication system.

According to various embodiments of the present disclosure, an apparatus of an AMF for a first communication system in a wireless communication system may include at least one transceiver, and at least one processor operatively coupled with the at least one transceiver, wherein the at least one processor may be configured to transmit a request message for security of the second communication system to a UDM, receive a response message from the UDM, and transmit a security key for an eNB of the second communication system to the eNB, based on the response message, the security key may be obtained from the base security key of the second communication system, and the base security key may be associated with a security key of the first communication system.

According to various embodiments of the present disclosure, an apparatus of a UDM for a first communication system in a wireless communication system may include at least one transceiver, and at least one processor operatively coupled with the at least one transceiver, the at least one processor may be configured to receive a request message for security of a second communication system from an AMF for the first communication system, and transmit to the AMF a response message for transmitting a security key for an eNB of the second communication system to the eNB, and the security key may be obtained from the base security key of the second communication system.

An apparatus and a method according to various embodiments of the present disclosure may enhance security of a 5th (5G) communication system in an environment where the 5G communication system and a 4th (4G) generation communication system coexist, and thus perform stable and efficient communication between a terminal and a network.

Effects obtainable from the present disclosure are not limited to the above-mentioned effects, and other effects which are not mentioned may be clearly understood by those skilled in the technical field to which the present disclosure pertains through the following descriptions.

DETAILED DESCRIPTION

Figure 1:
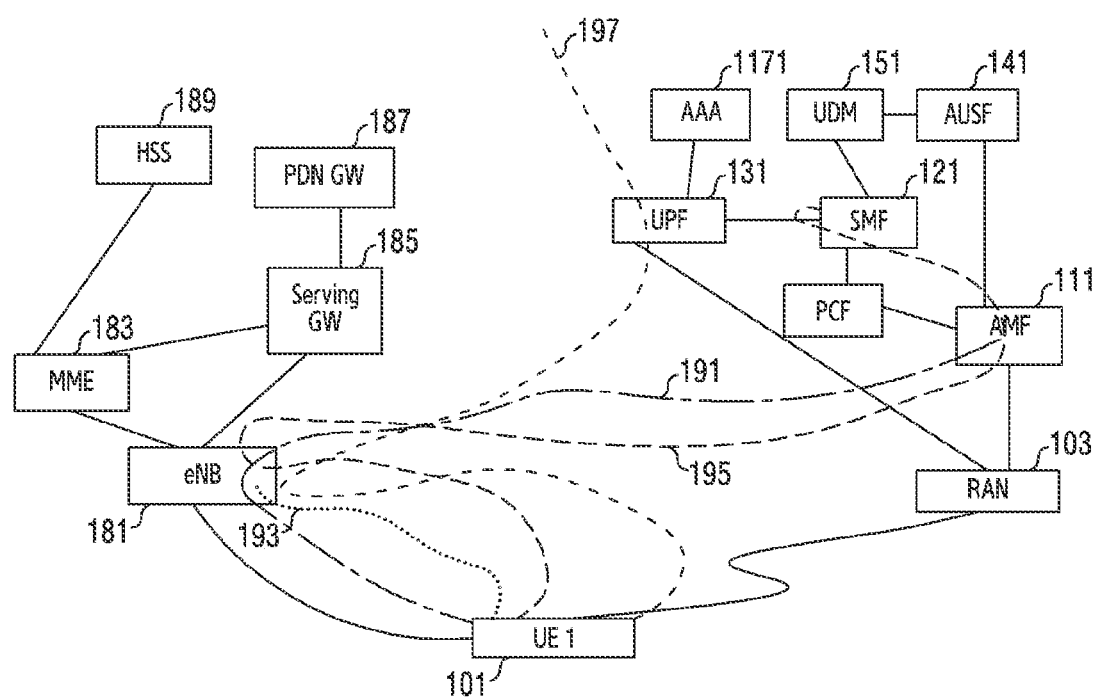
FIG. 1 illustrates an example of a network environment according to various embodiments of the present disclosure.

Terms used in the present disclosure are used for describing particular embodiments, and are not intended to limit the scope of other embodiments. A singular form may include a plurality of forms unless it is explicitly differently represented. All the terms used herein including technical and scientific terms may have the same meanings as terms generally understood by those skilled in the art of the present disclosure. The terms defined in a general dictionary among terms used in the present disclosure may be interpreted to have the same or similar meanings with context of the relevant art, and, unless explicitly defined in this disclosure, it shall not be interpreted ideally or excessively as formal meanings. In some cases, even terms defined in this disclosure should not be interpreted to exclude the embodiments of the present disclosure.

Various embodiments of the present disclosure to be described below will describe a hardware approach as an example. However, since the various embodiments of the present disclosure include a technology using both hardware and software, the various embodiments of the present disclosure do not exclude a software-based approach.

Hereafter, preferred embodiments of the present invention are described in detail with reference to the attached drawings. In so doing, it should be noted that the same component in the attached drawings is indicated by the same reference numeral as possible. In addition, detailed descriptions of known functions and configurations which may obscure the subject matter of the present invention shall be omitted.

In describing the embodiments, technical contents well known in the technical field to which the present invention pertains and which are not directly related to the present invention will be omitted in the specification. This is to more clearly provide the subject matter of the present invention by omitting unnecessary descriptions without obscuring the subject matter of the present invention.

For the same reason, some components in the accompanying drawings are exaggerated, omitted, or schematically illustrated. Also, a size of each component does net entirely reflect an actual size. The same reference number is given to the same or corresponding element in each drawing.

Advantages and features of the present invention, and methods for achieving them will be clarified with reference to embodiments described below in detail together with the accompanying drawings. However, the present invention is not limited to the embodiments disclosed below, but may be implemented in various different forms, and the embodiments are provided to only complete the disclosure of the present invention and to allow those skilled in the art to which the present invention pertains to fully understand a category of the invention. The same reference numeral refers to the same element throughout the specification.

Terms for identifying access nodes, terms indicating network entities, terms indicating messages, terms indicating interfaces between network entities, and terms indicating various identification information, which are used in the following descriptions, are for the sake of explanations. Accordingly, the present invention is not limited to the terms to be described, and may use other terms having technically identical meaning.

To ease the following description, the present invention uses terms and names defined in a specification for 5th generation (5G) communication system (new radio (NR), long term evolution (LTE) system). However, the present invention is not limited by the terms and names, and may be applied to a systems conforming to other standard.

That is, as describing in detail embodiments of the present invention, a communication specification standardized by 3rd generation partnership project (3GPP) is mainly targeted, but the main aspect of the present invention may be applied with slight modification within a range significantly departing from the scope of the present invention, which will be determined by those having technical background skilled in the technical field of the present invention.

The present disclosure relates to an environment where a 5G communication system (e.g., NR of 3GPP) and a 4G communication system (e.g., LTE of 3GPP) coexist. Particularly, the present disclosure relates to a method for enhancing security or an apparatus for performing such a function in non stand alone 5G communication which conducts communication using a network entity of LTE of 4G, and stand alone 5G communication, in the environment where the advanced 5G communication system and the 4G LTE communication coexist.

As the 5G mobile communication network is introduced, an access and mobility management function (AMF) which manages mobility of a terminal and a session management function (SMF) which manages a session are separated. Hence, as the entities for the mobility management and the session management entity are separated unlike an existing management scheme managed by a mobile management entity (MME) together in the existing communication system (e.g., the 4G LTE communication), a communication method and a communication management method between the terminal and the network entities are changed.

In the 5G communication, the mobility management is conducted by the AMF through a non-3GPP inter-working function (N3IWF) for non-3GPP access, and the session management is performed through the SMF. In addition, not only the mobility management but also security-related information which is an important factor in the mobility management are handled by the AMF. Meanwhile, the mobility management and the session management are performed by the MME in the 4G communication system (e.g., LTE).

The 5G communication system (e.g., NR) may have not only a stand alone form of the 5G communication system, but also a form of a non stand alone architecture having entities of 4G communication system and entities of the 5G communication system, and using some of the entities of the 4G communication system in the 5G communication.

Hereafter, the present disclosure provides a method for reducing data loss and enhancing security in the non stand alone 5G communication scheme using some entities of the 4G communication system of the 5G communication system, and the stand alone 5G communication system, in an environment where the next-generation 5G communication system (e.g., NR) and the 4G communication system (e.g., LTE) coexist. That is, the present disclosure describes various embodiments for enhancing the security of a 5G communication scheme in the environment where the 5G communication system and the 4G communication system coexist.

In explaining operations between each network entity and a terminal of the present disclosure, a base station may be referred to as, in addition to the base station, 'an access point (AP)', 'an eNodeB (eNB)', 'a 5G node', 'a next generation NodeB (gNB)', 'a 5G NodeB (5gNB)', 'a wireless point', 'a transmission/reception point (TRP)', 'a digital unit (DU)', 'a radio unit (RU)', 'a remote radio head (RRH)' or other term having an equivalent technical meaning. In addition, the terminal may be referred to as, in addition to the terminal, 'a user equipment (UE)', 'a mobile station', 'a subscriber station', 'a remote terminal', 'a wireless terminal', 'an electronic device', or 'a user device' or other term having an equivalent technical meaning. A base station for managing a 4G network (e.g., evolved universal terrestrial radio access network (E-UTRAN)) may be referred to as an eNB. A base station for managing a 5G network (e.g., 5G radio access network (RAN)) may be referred to as a gNB.

FIG. 1 illustrates an example of a network environment according to various embodiments of the present disclosure. An apparatus, a method, and a system for secure communication using some of entities building a 4G or 5G network in a 5G communication network and a 4G communication network are described in FIG. 1.

Referring to FIG. 1, the network environment may include a 4G network (e.g., LTE). The 4G network may include, as network entities, an eNB 181, an MME 183, a serving gateway (S-GW) 185, a packet data network-gateway (P-GW) 187, and a home subscriber server (HSS) 189. The eNB 181 may be network equipment for a 4G RAN of a UE 101.

The network environment may include a 5G network (e.g., NR). The 5G network may include, as network entities, a user plane function (UPF) 131, a session management function (SMF), an AMF 111, a 5G RAN 103, a user data management (UDM) 151, a policy control function (PCF) and so on. In addition, for authentication of each entity, the 5G network may include an authentication server function (AUSF) 141 and an authentication, authorization and accounting (AAA) 1171. The 5G RAN 103 is a network equipment for the 5G RAN of the UE 101, and may be referred to as a gNB, a 5gNB, or a 5G base station.

Meanwhile, an N3IWF may exist for a case where the UE communicates through non 3GPP access, session management may be controlled by the UE, the non 3GPP access, the N3IWF, and the SMF in the communication through the non 3GPP access, and mobility management may be controlled by the UE, the non 3GPP access, the N3IWF, and the AMF in the communication through the non 3GPP access.

Meanwhile, an embodiment of the present disclosure assumes a situation where the 5G communication system and the 4G communication system coexist. The LTE communication system includes an MME which performs the mobility management and the session management. The MME is responsible for the control in the UE communication. The 5G communication system separates the entity for the mobility management and the entity for the session management to the AMF and the SM, unlike the LTE communication system. A stand alone deployment architecture which performs communication only with 5G communication entities for the 5G communication or non stand alone deployment architectures using 4G communication entities and 5G communication entities for the 5G communication may be considered.

Referring to FIG. 1, if a UE communicates with a network, control signaling (path 193) may uses the eNB, and deployment using a 5G entity of a core network (CN) is allowed. Herein, the UE and the AMF are responsible for the mobility management (path 191) and the UE and the SMF are responsible for the session management (path 195) in a non-access stratum (NAS) which is a layer 3, whereas the AS which is a layer 2 is transmitted through the UE and the eNB (path 193). Hence, a method for generating and managing a security context is required. Thus, the present disclosure shall describe security context generation, management, and protocol exchange applicable to such a deployment situation.

The communication network of the present disclosure assumes the 5G network (e.g., NR network) and/or the 4G network (e.g., LTE network), but embodiments of the present disclosure may be applied in the same or similar manner, if the same concept is applied to other communication system within a category which may be understood by those having ordinary skill in the art.

In the network of the present disclosure, two communication systems may operate as sub-systems. For example, two communication systems may include LTE and NR. A system according to embodiments of the present disclosure may be configured to include some network entities provided in the LTE communication system and some network entities provided in the NR communication system.

Figure 2:
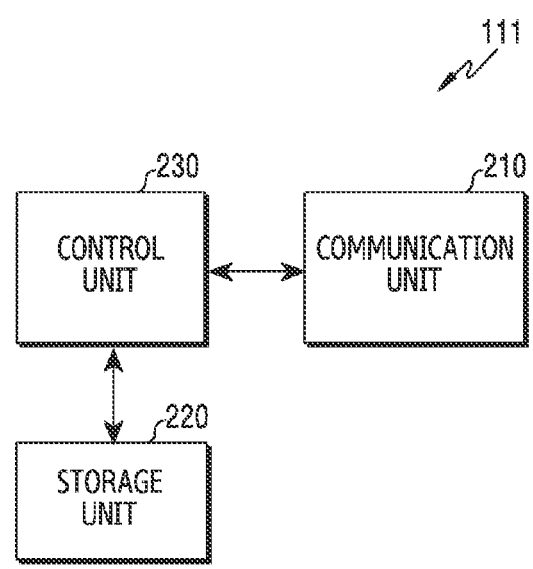
FIG. 2 illustrates a functional configuration of an access and mobility management function (AMF) according to various embodiments of the present disclosure.

FIG. 2 illustrates a functional configuration of an AMF according to various embodiments of the present disclosure. The configuration illustrated in FIG. 2 may be understood as the AMF 111 of FIG. 1. A term such as '~unit' or '~er' used hereafter indicates a unit for processing at least one function or operation, and may be implemented using hardware, software, or a combination of hardware and software.

Referring to FIG. 2, the AMF may include a communication unit 210, a storage unit 220, and a control unit 230.

The communication unit 210 may perform functions for transmitting and receiving signals, in a wired communication environment. The communication unit 210 may include a wired interface, for controlling a direct connection between a device and a device through a transmission medium (e.g., copper wire, optical fiber). For example, the communication unit 210 may forward an electrical signal to other device through a copper wire, or may perform conversion between an electrical signal and an optical signal. The communication unit 210 may transmit and receive signals between network entities which build a core network according to a wired communication interface standard.

The communication unit 210 may perform functions for transmitting and receiving signals over a wireless channel. For example, the communication unit 210 performs a conversion function between a baseband signal and a bit stream according to a physical layer standard of the system. For example, in data transmission, the communication unit 210 generates complex symbols by encoding and modulating a transmit bit stream. In addition, in data reception, the communication unit 210 restores a received bit stream by demodulating and decoding a baseband signal. In addition, the communication unit 210 up-converts a baseband signal to a radio frequency (RF) band signal, transmits it through an antenna, and down-converts an RF band signal received through the antenna to a baseband signal. For example, the communication unit 210 may include a transmission filter, a reception filter, an amplifier, a mixer, an oscillator, a digital to analog converter (DAC), and an analog to digital convertor (ADC).

Also, the communication unit 210 may include a plurality of transmit and receive paths. Further, the communication unit 210 may include at least one antenna array including a plurality of antenna elements. In view of the hardware, the communication unit 210 may include a digital circuit and an analog circuit (e.g., an RF integrated circuit (RFIC)). Herein, the digital circuit and the analog circuit may be implemented as a single package. Also, the communication unit 210 may include a plurality of RF chains. Further, the communication unit 210 may perform beamforming.

In addition, the communication unit 210 may include different communication modules to process signals of different frequency bands. Further, the communication unit 210 may include a plurality of communication modules to support a plurality of different radio access technologies. For example, the different radio access technologies may include Bluetooth low energy (BLE), wireless fidelity (Wi-Fi), WiFi gigabyte (WiGig), a cellular network (e.g., LTE), and so on. In addition, the different frequency bands may include a super high frequency (SHF) band (e.g., 2.5 GHz, 5 Ghz) and a millimeter wave (e.g., 60 GHz) band.

The communication unit 210 transmits and receives the signals as stated above. Hence, whole or part of the communication unit 210 may be referred to as a 'transmitter', a 'receiver', or a 'transceiver'. In addition, the transmission and the reception over the radio channel are used as the meaning which embraces the above-stated processing of the communication unit 210 in the following explanations.

The storage unit 220 stores a basic program for operating the network entity, an application program, and data such as setting information. The storage unit 220 may include a volatile memory, a non-volatile memory or a combination of a volatile memory and a non-volatile memory. The storage unit 220 provides the stored data according to a request of the control unit 230.

The control unit 230 controls general operations of the AMF. For example, the control unit 230 transmits and receives signals through the communication unit 210. Also, the control unit 230 records and reads data in and from the storage unit 220. The control unit 230 may execute functions of a protocol stack required by a communication standard. According to another embodiment, the protocol stack may be included in the communication unit 210. For doing so, the control unit 230 may include at least one processor.

According to various embodiments, the control unit 230 may control the AMF to perform operations according to various embodiments of the present disclosure. For example, the control unit 230 may control the communication unit to forward a message received from the UDM to the eNB or UE, or to transmit Security mode command and Registration accept messages.

Figure 3:
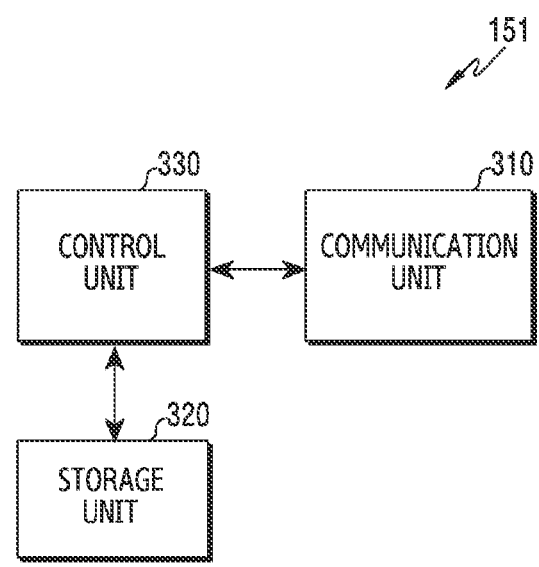
FIG. 3 illustrates a functional configuration of a user data management (UDM) according to various embodiments of the present disclosure.

FIG. 3 illustrates a functional configuration of an UDM according to various embodiments of the present disclosure. The configuration illustrated in FIG. 3 may be understood as the UDM 151 of FIG. 1. A term such as '~unit' or '~er' used hereafter indicates a unit for processing at least one function or operation, and may be implemented using hardware, software, or a combination of hardware and software.

Referring to FIG. 3, the UDM may include a communication unit 310, a storage unit 320, and a control unit 330.

The communication unit 310 may perform functions for transmitting and receiving signals, to a wired communication environment. The communication unit 310 may include a wired interface, for controlling a direct connection between a device and a device through a transmission medium (e.g., copper wire, optical fiber). For example, the communication unit 310 may forward an electrical signal to other device through a copper wire, or may perform conversion between an electrical signal and an optical signal. The communication unit 310 may transmit and receive signals between network entities which build a core network according to a wired communication interface standard.

The communication unit 310 may perform functions for transmitting and receiving signals over a wireless channel. The communication unit 310 may include a plurality of transmit and receive paths. The communication unit 310 may include different communication modules to process signals of different frequency bands. The functional descriptions of the communication unit 210 may be applied to the communication unit 310 of FIG. 3 identically or similarly.

The storage unit 320 stores a basic program for operating the network entity, an application program, and data such as setting information. The storage unit 320 may include a volatile memory, a non-volatile memory or a combination of a volatile memory and a non-volatile memory. The storage unit 320 provides the stored data according to a request of the control unit 330.

The control unit 330 controls general operations of the UDM. For example, the control unit 330 transmits and receives signals through the communication unit 310. Also, the control unit 330 records and reads data in and from the storage unit 320. The control unit 330 may execute functions of a protocol stack required by a communication standard. According to another embodiment, the protocol stack may be included in the communication unit 310. For doing so, the control unit 330 may include at least one processor.

According to various embodiments, the control unit 330 may control the UDM to perform operations according to various embodiments of the present disclosure. For example, the control unit 330 may control the communication unit to perform mapping of identifiers between different mobile networks, based on a request message received from the AMF, to obtain an identifier of other cellular network and to transmit the obtained identifier to other entity.

Figure 4:
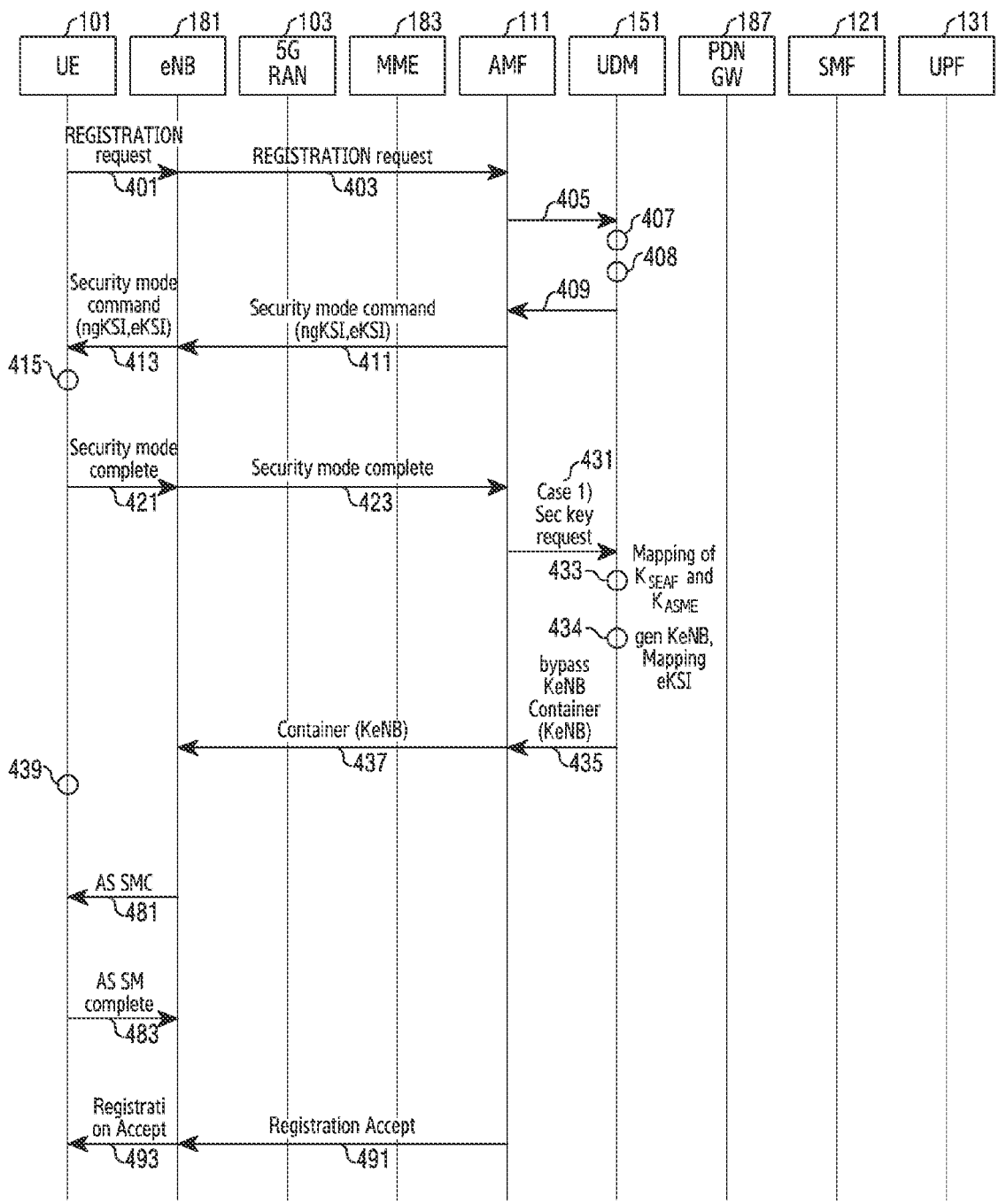
FIG. 4 illustrates signal flow between network entities for security according to various embodiments of the present disclosure.

FIG. 4 illustrates signal flow between network entities for security according to various embodiments of the present disclosure. In FIG. 4, communication procedures and methods for the security in a network environment where network entities according to a 5G communication system and network entities according to a 4G communication system coexist are described. As the network entities, the UE 101, the eNB 181, the 5G RAN 103 (e.g., gNB), the MME 183, the AMF 111, the UDM 151, the PDN GW 187, the SMF 121, and the UPF 131 of FIG. 1 are illustrated.

Referring to FIG. 4, the UE may transmit a Registration Request message to the eNB (i.e., a base station for E-UTRAN) in step 401. The eNB may transmit the Registration Request message to the AMF in step 403. That is, the UE may transmit the Registration Request message to the AMF via the eNB.

In some embodiments, the AMF and the UDM may perform step 405, step 407, step 408, and step 409. In some other embodiments, if not performing step 405, step 407, step 408, and step 409, the AMF and the UDM may perform step 431, step 433, step 434, and step 435. Hereafter, operations of step 405 through step 409 are explained.

In step 405, the AMF may request a security key from the UDM. Herein, requesting the security key is a process of requesting a key to be used for the communication between the UE and the eNB. The AMF has $K_{AMF}$ obtained from $K_{SEAF}$. Since the UE also has $K_{AMF}$, the communication between the UE and the AMF may be possible. However, $K_{eNB}$ is required for the communication of the UE and the eNB, $K_{ASME}$ is required to derive this, and accordingly the AMF requests the security key from the UDM. Herein, $K_{ASME}$ may be obtained from an access security management entity (ASME) as an authentication key. In the LTE network, an HSS serves as the ASME in the EPS.

In step 407, the UDM may perform mapping between $K_{SEAF}$ which is the security key of 5G (e.g., NR) and $K_{ASME}$ which is the security key of 4G (e.g., LTE). In the NAS which is the communication between the UE and the AMF, $K_{SEAF}$ may be used as a seed for the UE and the AMF to generate $K_{NASint}$, $K_{NASenc}$ from $K_{AMF}$ by using 5G CN. In an access stratum (AS) between the UE and the eNB, the UE and the eNB generally generate the UE and MME by using $K_{ASME}$ as the seed, but the UE and the UDM generate $K_{eNB}$ in this embodiment, and accordingly mapping between $K_{SEAF}$ and $K_{ASME}$ may be performed.

According to various embodiments of the present disclosure, a method of mapping between $K_{SEAF}$ and $K_{ASME}$ and managing an index of the mapping may be considered. That is, an index-key for indicating the mapping relationship may be defined. The index-key is an identifier for identifying the mapping relationship of $K_{SEAF}$ and $K_{ASME}$, and their pairs may be used for NAS security and AS security respectively.

According to various embodiments of the present disclosure, as another embodiment, a method of mapping ngKSI and eKSI related to a context to be used in the UE and eNB communication may be used in the NAS which is the communication of the UE and the AMF. ngKSI may be a key set identifier used in the 5G communication system. eKSI may be a key set identifier used in the E-UTRAN.

In step 408, the UDM may generate $K_{eNB}$ to be used at the eNB. The UDM may map eKSI and $K_{ASME}$ used to generate $K_{eNB}$. Ty mapping eKSI and $K_{ASME}$ used to generate $K_{eNB}$, the UDM may map eKSI and $K_{eNB}$. Hence, the UDM may indicate that $K_{eNB}$ is used for the corresponding eKSI.

In step 409, the UDM may forward $K_{eNB}$ forwarded to the eNB by bypassing to the AMF. Thus, $K_{eNB}$ may be transmitted to the eNB transparently with respect to the AMF.

In step 411, the AMF may transmit a Security Mode Command to the eNB. In step 413, the eNB may transmit the Security Mode Command to the UE. That is, the AMF may transmit the Security Mode Command to the UE via the eNB. At this time, the AMF may transmit ngKSI which is an index of the key related to the NAS and eKSI related to $K_{eNB}$. Hence, $K_{AMF}$ related to the NAS may be synchronized (sync) to ngKSI by the UE and the AMF, and not only the UE and the AMF but also the UE and the eNB may synchronize through eKSI indicating $K_{ASME}$ related to $K_{eNB}$, that is, $K_{ASME}$ for deriving $K_{eNB}$. Hereafter, the synchronization in the present disclosure indicates that, in the key set used for the security, the same key may be identified between two entities (e.g., the UE and the AMF, or the UE and the eNB).

In step 415, the UE may map $K_{AMF}$ and $K_{ASME}$ through ngKSI associated with $K_{AMF}$ and eKSI associated with $K_{ASME}$.

In step 421, the UE may transmit Security Mode Complete to the eNB. In step 423, the eNB may transmit Security Mode Complete to the AMF. That is, the UE may transmit Security Mode Complete to the AMF via the eNB.

As mentioned earlier, if step 405 through step 409 are not conducted, step 431 through step 435 may be performed. That is, the following step 431 through step 435 are the embodiment which may be carried out if the corresponding operations are not performed in step 405 through step 409. Hereafter, operations of step 431 through step 435 are described.

In step 431, the AMF may request a security key from the UDM. Herein, requesting the security key is a process for requesting a key to be used for the communication between the UE and the eNB. The AMF may obtain $K_{AMF}$ from $K_{SEAF}$. Since the UE may also have $K_{AMF}$, the communication between the UE and the AMF is possible. However, since $K_{eNB}$ is required for the communication between the UE and the eNB, $K_{eNB}$ is requested. Alternatively, since $K_{ASME}$ is required to derive $K_{eNB}$, the AMF may request $K_{ASME}$ from the UDM. According to an embodiment, if requesting $K_{ASME}$, the AMF may receive $K_{ASME}$ and generate $K_{eNB}$.

In step 433, the UDM may map $K_{SEAF}$ which is the security key of the 5G communication system and $K_{ASME}$ which is the security key of the 4G communication system. Such mapping uses the 5G CN in the NAS which is the communication between the UE and the AMF communication, and $K_{SEAF}$ may be used as the seed for the UE and the AMF to generate $K_{NASint}$, $K_{NASenc}$, from $K_{AMF}$. In the AS between the UE and the eNB, since the UE and the eNB generate $K_{eNB}$ with $K_{ASME}$ as the seed, the mapping between $K_{SEAF}$ and $K_{ASME}$ is performed.

According to various embodiments of the present disclosure, the mapping between $K_{SEAF}$ and $K_{ASME}$ may be performed. Also, a method for managing the index according to mapping may be considered. That is, the index-key indicating the mapping is an identifier for identifying the mapping of $K_{SEAF}$ and $K_{ASME}$, and their pairs may be managed for the NAS security and the AS security respectively.

According to various embodiments of the present disclosure, the NAS which is the communication between the UE and the AMF may also consider a method for mapping ngKSI, and eKSI related to $K_{eNB}$ a related to the context to be used by the UE and eNB as another method.

In step 434, the UDM may generate $K_{eNB}$ to be used in the eNB. By mapping eKSI indicating $K_{ASME}$ used to generate $K_{eNB}$ and $K_{eNB}$, the UDM may indicate that $K_{eNB}$ is used for the corresponding eKSI.

In step 435, the UDM may forward $K_{eNB}$ forwarded to the eNB by bypassing to the AMF. That is, $K_{eNB}$ may be forwarded to the eNB transparently to the AMF.

In step 437, the AMF may transmit to the eNB. At this time, $K_{eNB}$ may be required to be forwarded transparently to the AMF. That is, $K_{eNB}$ may be required to be transparently transmitted to the AMF, not to perform any action with the corresponding security key by the AMF by bypassing to the AMF.

In step 439, the UE may generate $K_{eNB}$ from $K_{ASME}$.

In step 481, the eNB may transmit an AS Security Mode Command message to the UE.

In step 483, the UE may transmit a Security Mode Complete message to the eNB.

In step 491, the AMF may transmit Registration Accept to the eNB. In step 493, the eNB may transmit Registration Accept to the UE. That is, Registration Accept may be transmitted from the AMF to the UE via the eNB.

Figure 5:
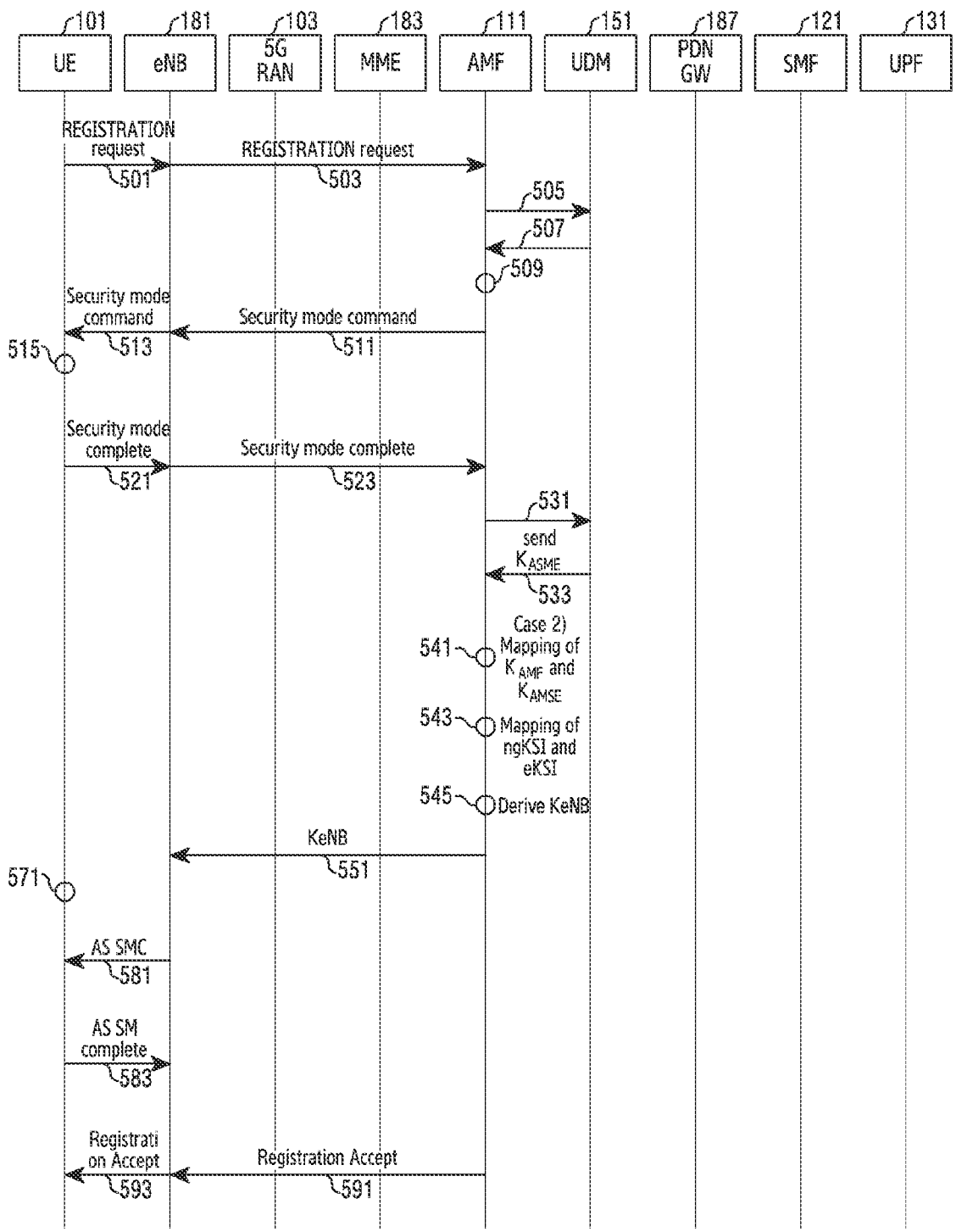
FIG. 5 illustrates another signal flow between network entities for security according to various embodiments of the present disclosure.

FIG. 5 illustrates another signal flow between network entities for security according to various embodiments of the present disclosure. In FIG. 5, communication procedures and methods for the security in a network environment where a network entity according to a 5G communication system and a network entity according to a 4G communication system coexist are described. As the network entities, the UE 101, the eNB 181, the 5G RAN 103 (e.g., gNB), the MME 183, the AMF 111, the UDM 151, the PDN GW 187, the SMF 121, and the UPF 131 of FIG. 1 are illustrated.

Referring to FIG. 5, in step 501, the UE may transmit a Registration Request message to the eNB. The eNB may transmit the Registration Request message to the AMF in step 503. That is, the UE may transmit the Registration Request message to the AMF via the eNB.

In some embodiments, the AMF and the UDM may perform step 505, step 507, and step 509. In some other embodiments, if not performing step 505, step 507, and step 509, the AMF and the UDM may perform step 531, step 533, step 541, step 543 and step 545. Hereafter, operations of step 505 through step 509 are explained.

In step 505, the AMF may request a security key from the UDM. Herein, requesting the security key is a process of requesting a seed for a key to be used for the communication between the UE and the eNB. Since the AMF has $K_{AMF}$ from $K_{SEAF}$ and the UE also has $K_{AMF}$, the AMF and the UE may communicate with each other. However, since the communication of the UE and the eNB requires $K_{eNB}$, and $K_{ASME}$ is required to derive this, the AMF requests the security key from the UDM.

In step 507, the UDM may transmit $K_{ASME}$ to the AMF.

In step 509, the AMF may perform mapping of the 5G security key $K_{AMF}$ and the 4G security key $K_{ASME}$. The NAS which is the communication between the UE and the AMF uses the 5G CN, and $K_{AMF}$ may be used as the seed for the UE and the AMF to generate $K_{NASint}$, $K_{NASenc}$ from $K_{AMF}$. In the AS which is the communication between the UE and the eNB, since the UE and the eNB generate $K_{eNB}$ with $K_{ASME}$ as the seed, mapping between $K_{ASME}$ and $K_{AMF}$ may be performed.

According to various embodiments of the present disclosure, a method for mapping between $K_{AMF}$ and $K_{ASME}$ and managing an index of the mapping may be considered. That is, an index-key is an identifier for identifying the mapping relationship of $K_{AMF}$ and $K_{ASME}$, and their pairs may be used for the NAS security and the AS security respectively.

According to various embodiments of the present disclosure, as yet another embodiment, the NAS which is the communication between the UE and the AMF may use a method of mapping ngKSI, and eKSI related to the context to be used at the UE.

In step 511, the AMF may transmit a Security Mode Command to the eNB. In step 513, the eNB may transmit the Security Mode Command to the UE. That is, the AMF may transmit the Security Mode Command to the UE via the eNB. At this time, the AMF may transmit ngKSI which is the index of the key related to the NAS and eKSI related to $K_{eNB}$. Thus, $K_{AMF}$ related to the NAS may be synchronized with ngKSI by the UE and the AMF, and the UE and the AMF and also the UE and the eNB may synchronize through eKSI indicating $K_{ASME}$ related to $K_{eNB}$, that is, $K_{ASME}$ for deriving $K_{eNB}$.

In step 515, the UE may map $K_{AMF}$ and $K_{ASME}$ through ngKSI related to $K_{AMF}$, and eKSI related to $K_{ASME}$.

In step 521, the UE may transmit Security Mode Complete to the eNB. In step 523, the eNB may transmit the Security Mode Complete to the AMF. That is, the UE may transmit Security Mode Complete to the AMF via the eNB.

As mentioned earlier, if step 505 through step 509 are not performed, step 531 through step 545 may be performed. That is, the following step 531 through step 545 are yet another embodiment which may be carried out, if operations such as step 505, step 507, and step 509 are not conducted in step 505, step 507, and step 509. Hereinafter, operations of step 531 through step 545 are explained.

In step 531, the AMF may request a security key from the UDM. Herein, requesting the security key is a process of requesting a seed for a key to be used for the communication between the UE and the eNB. That is, since the AMF has $K_{AMF}$ from $K_{SEAF}$ and the UE also has $K_{AMF}$, the communication between the UE and the AMF is possible. However, since the communication of the UE and the eNB requires $K_{eNB}$, and $K_{ASME}$ is required to derive this, the AMF requests it.

In step 533, the UDM may transmit $K_{ASME}$ to the AMF.

In step 541, the AMF may perform mapping of the 5G security key $K_{AMF}$ and the 4G LTE security key $K_{ASME}$. Since the NAS which is the communication between the UE and the AMF uses $K_{AMF}$ as the seed for the UE and the AMF to generate $K_{NASint}$, $K_{NASenc}$ from $K_{AMF}$ by using the 5G CN, and the AS which is the communication between the UE and the eNB generate $K_{eNB}$ with $K_{ASME}$ as the seed, such mapping performs the mapping between $K_{ASME}$ and $K_{AMF}$.

According to various embodiments of the present disclosure, a method for mapping between $K_{AMF}$ and $K_{ASME}$ and managing an index according to the mapping may be considered. In so doing, an index-key used is an identifier for identifying the mapping of $K_{AMF}$ and $K_{ASME}$, and their pairs may be used for the NAS security and the AS security respectively.

According to various embodiments of the present disclosure, a method for mapping ngKSI used in the NAS which is the communication between the UE and the AMF, and eKSI related to the context to be used at the UE as shown in step 543 may be used as another method.

In step 545, the AMF may generate $K_{eNB}$ to be used at the eNB. The AMF may map eKSI and $K_{ASME}$. Since $K_{ASME}$ is used to generate $K_{eNB}$, the AMF may map that $K_{eNB}$ is used for the corresponding eKSI by mapping eKSI and $K_{eNB}$.

In step 551, $K_{eNB}$ generated at the AMF may be transmitted from the AMF to the eNB. That is, the AMF may transmit $K_{eNB}$ to the eNB.

In step 571, the UE may generate $K_{eNB}$ from $K_{ASME}$.

In step 581, the eNB may transmit an AS Security Mode Command message to the UE.

In step 583, the UE may transmit a Security Mode Complete message to the eNB.

Next, in step 591, the AMF may transmit a Registration Accept to the eNB. In step 593, the eNB may transmit the Registration Accept to the UE. That is, the Registration Accept is transmitted from the AMF to the UE via the eNB.

Figure 6:
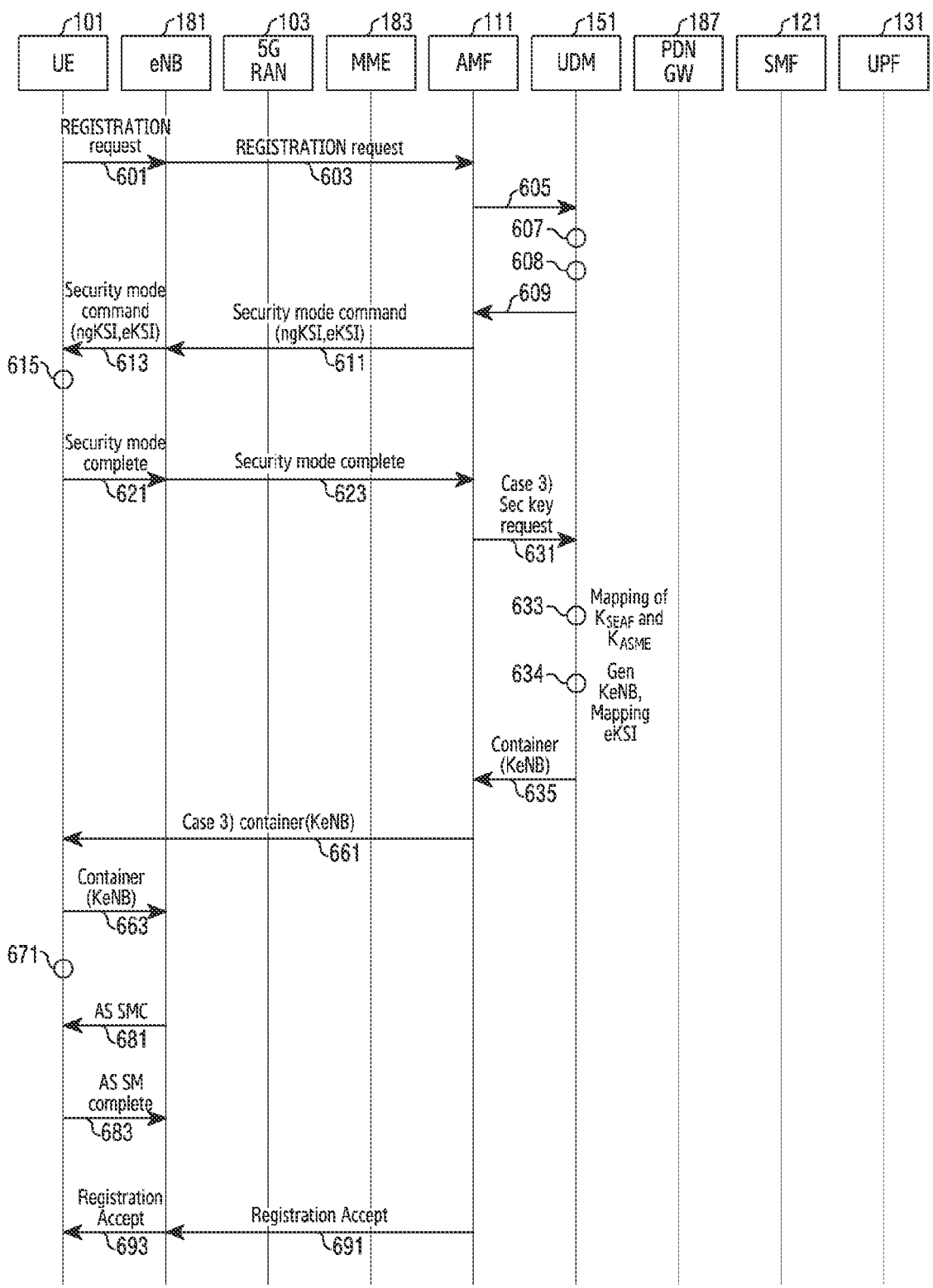
FIG. 6 illustrates yet another signal flow between network entities for security according to various embodiments of the present disclosure.

FIG. 6 illustrates another signal flow between network entities for security according to various embodiments of the present disclosure. In FIG. 6, communication procedures and methods for the security in a network environment where network entities according to a 5G communication system and network entities according to a 4G communication system coexist are described. As the network entities, the UE 101, the eNB 181, the 5G RAN 103 (e.g., gNB), the MME 183, the AMF 111, the UDM 151, the PDN GW 187, the SMF 121, and the UPF 131 of FIG. 1 are illustrated.

Referring to FIG. 6, in step 601, the UE may transmit a Registration Request message to the eNB. In step 603, The eNB may transmit the Registration Request message to the AMF. That is, the UE may transmit the Registration Request message to the AMF via the eNB.

In some embodiments, the AMF and the UDM may perform step 605, step 607, step 608 and step 609. In some other embodiments, if not performing step 605, step 607, step 608 and step 609, the AMF and the UDM may perform step 631, step 633, step 634, and step 635. Hereafter, operations of step 605 through step 609 are explained.

In step 605, the AMF may request a security key from the UDM. Herein, requesting the security key is a process of requesting the key to be used for the communication between the UE and the eNB. That is, since the AMF has $K_{AMF}$ from $K_{SEAF}$ and the UE also has $K_{AMF}$, the communication between the UE and the AMF is possible. However, since the communication between the UE and the eNB requires $K_{eNB}$, and $K_{ASME}$ is required to derive this, the AMF requests the security key (i.e., a key for the AS communication between the UE and the eNB) from the UDM in place of the eNB.

In step 607, the UDM may map $K_{SEAF}$ which is the 5G security key and $K_{ASME}$ which is the 4G LTE security key. In the NAS which is the communication between the UE and the AMF, $K_{SEAF}$ may be used as a seed for the UE and the AMF to generate $K_{NASint}$, $K_{NASenc}$ from $K_{AMF}$ by using 5G CN. In the AS which is the communication between the UE and the eNB, the mapping between $K_{SEAF}$ and $K_{ASME}$ may be conducted, because the UE and the eNB generate $K_{eNB}$ with $K_{ASME}$ as the seed.

According to various embodiments of the present disclosure, a method of performing mapping between $K_{SEAF}$ and $K_{ASME}$ and managing its index may be considered. An index-key used in the index management is an identifier for identifying the mapping of $K_{SEAF}$ and $K_{ASME}$ and their pairs may be managed for the NAS security and the AS security respectively.

According to various embodiments of the present disclosure, as another embodiment, the NAS which is the communication between the UE and the AMF may use a method for mapping ngKSI, eKSI related to generating the $K_{eNB}$, and the context to be used at the UE and the eNB.

In step 608, the UDM may generate $K_{eNB}$ to be used at the eNB. By mapping eKSI and $K_{ASME}$, the UDM may indicate that $K_{eNB}$ is used for the corresponding eKSI by mapping eKSI and $K_{eNB}$.

In step 609, the UDM transmits $K_{eNB}$ to be transmitted to the eNB transparently to the AMF. That is, the AMF may be a point (or a network entity) passed through to forward to the eNB, without using $K_{eNB}$. Meanwhile, according to another embodiment, $K_{eNB}$ may not be transparently forwarded to the AMF.

In step 611, the AMF may transmit a Security Mode Command to the eNB. In step 613, the eNB may transmit a Security Mode Command to the UE. That is, the AMF may transmit the Security Mode Command to the UE via the eNB. At this time, the AMF may transmit ngKSI which is the index of the key related to the NAS, and eKSI related to $K_{ASME}$ used to derive $K_{eNB}$, that is, eKSI related to $K_{eNB}$. Thus, $K_{AMF}$ related to the NAS may be synchronized via ngKSI by the UE and the AMF, and $K_{ASME}$ related to $K_{eNB}$, that is, $K_{ASME}$ for deriving $K_{eNB}$ may be synchronized at the UE and the AMF using eKSI. That is, eKSI indicating $K_{ASME}$ may be synchronized at the UE and the AMF, and further at the UE and the eNB.

In step 615, the UE may map $K_{AMF}$ and $K_{ASME}$ through ngKSI associated with $K_{AMF}$, and eKSI associated with $K_{ASME}$.

In step 621, the UE may transmit a Security Mode Complete to the eNB. In step 623, the eNB may transmit the Security Mode Complete to the AMF. That is, the UE may transmit the Security Mode Complete to the AMF via the eNB.

As mentioned earlier, if step 605 through step 609 are not conducted, step 631 through step 635 may be performed. That is, the following step 631 through step 635 are an embodiment which may be carried out, if operations of step 605, step 607, and step 609 are not conducted in step 605, step 607, and step 609. Hereinafter, operations of step 631 through step 635 are explained.

In step 631, the AMF may request a security key from the UDM. Herein, requesting the security key is a process of requesting a key to be used for the communication between the UE and the eNB. That is, since the AMF has $K_{AMF}$ from $K_{SEAF}$ and the UE also has $K_{AMF}$, the communication between the UE and the AMF is possible. However, since the communication of the UE and the eNB requires $K_{eNB}$, it is requested. According to an embodiment, since $K_{ASME}$ is required to derive $K_{eNB}$, the AMF may request $K_{ASME}$ from the UDM. If requesting $K_{ASME}$, receiving $K_{ASME}$ and generating $K_{eNB}$ at the AMF may be considered as an embodiment.

In step 633, the UDM may perform mapping of the 5G (e.g., NR) security key $K_{SEAF}$ and the 4G LTE security key $K_{ASME}$. Since $K_{SEAF}$ is used as the seed for the UE and the AMF to generate $K_{NASint}$, $K_{NASenc}$ from $K_{AMF}$ by using the 5G CN, in the NAS which is the communication between the UE and the AMF, and $K_{ASME}$ is used as the seed by the UE and the eNB to generate $K_{eNB}$, in the AS which is the communication between the UE and the eNB, the mapping between $K_{SEAF}$ and $K_{ASME}$ may be conducted.

According to various embodiments of the present disclosure, a method for performing mapping between $K_{SEAF}$ and $K_{ASME}$ and managing its index may be considered, as an embodiment. That is, an index-key is an identifier for identifying the mapping of $K_{SEAF}$ and $K_{ASME}$ and their pairs may be managed for the NAS security and the AS security respectively.

According to various embodiments of the present disclosure, a method for mapping ngKSI used in the NAS which is the communication between the UE and the AMF, and eKSI indicating $K_{ASME}$ used to derive $K_{eNB}$ used at the UE and the eNB may be used as another embodiment.

In step 634, the UDM may generate $K_{eNB}$ to be used at the eNB from $K_{ASME}$. The UDM may map $K_{ASME}$ and eKSI. By mapping KASME used to generate $K_{eNB}$ and eKSI, the UDM may indicate that $K_{eNB}$ is used for the corresponding eKSI by mapping eKSI and $K_{eNB}$.

In step 635, the UDM may forward $K_{eNB}$ to the AMF, by bypassing $K_{eNB}$, forwarded to the eNB, to the AMF.

In step 661, the AMF may transmit $K_{eNB}$ to the UE. $K_{eNB}$ passing through the AMF may be transmitted from the AMF to the UE. At this time, $K_{eNB}$ must be transparently forwarded to the AMF, that is, the AMF is bypassed, so that the AMF does not perform any operation or processing with the corresponding security key. In addition, if $K_{eNB}$ is forwarded to the eNB via the AMF (if forwarded via UMD→AMF→UE→eNB), $K_{eNB}$ may also be forwarded to the eNB transparently to the UE. That is, the UE may forward the transparently transmitted $K_{eNB}$ to the eNB in step 663.

In step 671, the UE may also generate $K_{eNB}$ from $K_{ASME}$.

In step 681, the eNB may transmit an AS Security Mode Command message to the UE.

In step 683, the UE may transmit a Security Mode Complete message to the eNB.

Next, in step 691, the AMF may transmit a Registration Accept to the eNB. In step 693, the eNB may transmit the Registration Accept to the UE. That is, the Registration Accept may be transmitted from the AMF to the UE via the eNB.

In the specific embodiments of the present invention aforementioned, the elements included in the invention are expressed in a singular or plural form according to the suggested specific embodiment. However, the singular or plural expression is appropriately selected according to a proposed situation for the convenience of explanations, the present invention is not limited to a single element or a plurality of elements, the elements expressed in the plural form may be configured as a single element, and the elements expressed in the singular form may be configured as a plurality of elements.

Meanwhile, while the specific embodiment has been described in the explanations of the present invention, it will be noted that various changes may be made therein without departing from the scope of the present invention. Thus, the scope of the present invention is not limited and defined by the described embodiment and is defined by not only the scope of the claims as below but also their equivalents.

The invention claimed is:

1. A method performed by an access and mobility management function (AMF) for a first communication system, in a wireless communication system, comprising:

transmitting, to a user data management (UDM), a request message for security of the second communication system;

receiving, from the UDM, a response message including a security key for an eNB of the second communication system; and transmitting, to the eNB, the security key for the eNB of the second communication system, based on the response message, wherein the security key is obtained from a base security key of the second communication system, wherein the base security key is associated with a security key of the first communication system, wherein the first communication system is associated with a new radio (NR) based network, and wherein the second communication system is associated with a long term evolution (LTE) based network, wherein the security key of the first communication system is associated with $K_{AMF}$ or $K_{SEAF}$, wherein the base security key is associated with $K_{ASME}$, and wherein the security key for the eNB is associated with $K_{eNB}$.

2. The method of claim 1, wherein transmitting the security key to the eNB comprises: transmitting the response message to the eNB, and wherein the security key for the eNB is determined by the UDM.

3. The method of claim 1, wherein the response message comprises the base security key.

4. The method of claim 1, wherein the security key for the eNB of the second communication system is identified based on eKSI, and wherein the eKSI is associated with ngKSI comprising the security key of the first communication system.

5. A method performed by a user data management (UDM) for a first communication system, in a wireless communication system, comprising:

receiving, from an access and mobility management function (AMF), a request message for security of a second communication system for the first communication system; and transmitting, to the AMF, a response message including a security key for an eNB of the second communication system, wherein the security key is obtained from a base security key of the second communication system, wherein the base security key is associated with a security key of the first communication system, wherein the first communication system is associated with a new radio (NR) based network, and wherein the second communication system is associated with a long term evolution (LTE) based network, wherein the security key of the first communication system is associated with $K_{AMF}$ or $K_{SEAF}$, wherein the base security key is associated with $K_{ASME}$, and wherein the security key for the eNB is associated with $K_{eNB}$.

6. The method of claim 1, wherein transmitting the response message comprises: determining a security key for the eNB, from the base security key.

7. The method of claim 1, wherein the response message comprises the base security key.

8. The method of claim 5, wherein the security key for the eNB of the second communication system is identified based on eKSI, and wherein the eKSI is associated with ngKSI comprising a security key of the first communication system.

9. An apparatus of an access and mobility management function (AMF) for a first communication system, in a wireless communication system, comprising:

at least one transceiver; and at least one processor operatively coupled with the at least one transceiver, wherein the at least one processor is configured to:

transmit, to a user data management (UDM), a request message for security of the second communication system, receive, from the UDM, a response message including a security key for an eNB of the second communication system, and transmit, to the eNB, a security key for the eNB of the second communication system, based on the response message, wherein the security key is obtained from a base security key of the second communication system, wherein the base security key is associated with a security key of the first communication system, wherein the first communication system is associated with a new radio (NR) based network, and wherein the second communication system is associated with a long term evolution (LTE) based network, wherein the security key of the first communication system is associated with $K_{AMF}$ or $K_{SEAF}$, wherein the base security key is associated with $K_{ASME}$, and wherein the security key for the eNB is associated with $K_{eNB}$.

10. The apparatus of claim 9, wherein, for transmitting the security key to the eNB, the at least one processor is further configured to: transmit the response message to the eNB, and wherein the security key for the eNB is determined by the UDM.

11. The apparatus of claim 9, wherein the response message comprises the base security key.

12. The apparatus of claim 9, wherein the security key for the eNB of the second communication system is identified based on eKSI, and wherein the eKSI is associated with ngKSI comprising the security key of the first communication system.

* * * * *